July 22, 1930.   H. E. RIDER   1,771,098
THERMOSTAT INDICATOR
Original Filed Oct. 7, 1925
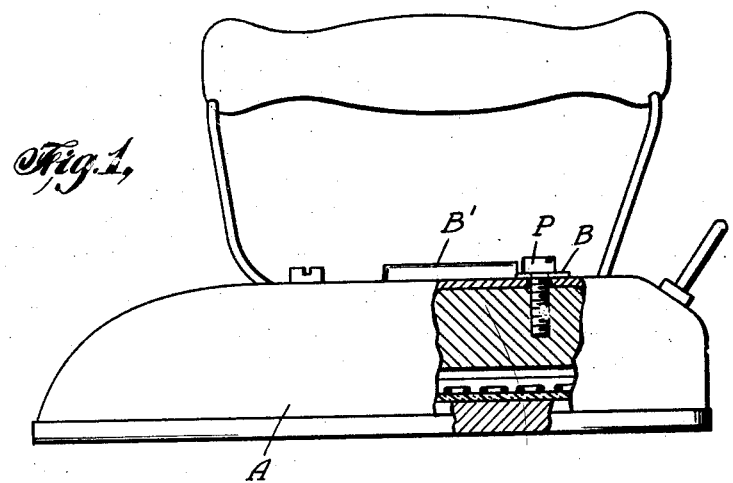
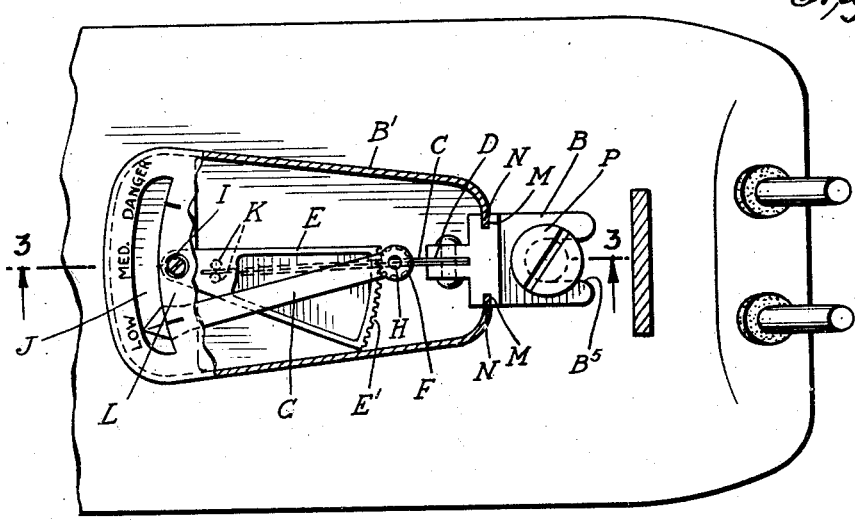
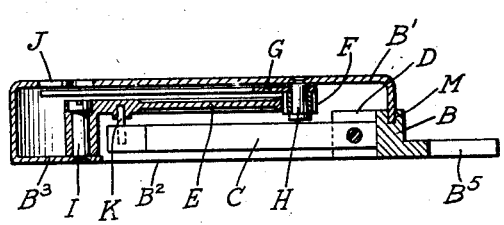
INVENTOR
Herbert E. Rider
BY
Frank M. Ashley
ATTORNEY Patented July 22, 1930

1,771,098

UNITED STATES PATENT OFFICE

HERBERT E. RIDER, OF NEW YORK, N. Y., ASSIGNOR OF ONE-FOURTH TO EDWARD L. HALL, OF NEW YORK, N. Y., AND ONE-HALF TO MAUD L. GRAY, OF PORTLAND, MAINE

THERMOSTAT INDICATOR

Application filed October 7, 1925, Serial No. 60,997. Renewed May 31, 1930.

My invention relates to temperature indicators.

The object of my invention is to provide a thermostat controlled indicator for use with sad-irons and other devices to which it may be attached for use, such as bake ovens, etc., and made as an independent article of manufacture.

A further object is to provide an indicator of the character described that is light in weight, small in size, and low in cost.

A further object is to provide means whereby the indicator may be attached to a sad-iron or oven, etc., by a single element which also serves to transmit the heat from the iron to the indicator to operate the same, and also permits the indicator to be attached and detached quickly when desired.

Referring to the drawings which form a part of this specification:

Fig. 1, is an elevational view, shown partly in section, of a sad-iron, with an indicator thereon.

Fig. 2, is a plan view of a sad-iron on an enlarged scale relative to that of Figure 1, showing a sad-iron with an indicator embodying my invention mounted thereon, the top plate of the indicator being broken away to disclose a plan view of the mechanism thereof.

Fig. 3, is a longitudinal sectional view of the indicator mechanism.

A, indicates a flat-iron of the electrically-heated type, on which is mounted an indicator comprising a base-plate B and casing B' mounted thereon and enclosing the indicator mechanism.

A thermostat member C is firmly held at one end thereof to the base-plate B by clamping it in a slot D, formed in the base-plate. All of the moving parts except the thermostat, are mounted on the casing and are removable therewith from the base-plate. The under side of the casing is cut away at B² to reduce the weight.

The moving parts comprise the thermostat C, a rack-frame E, a pinion F and indicator-hand G, which is directly connected to the pinion and is actuated thereby, so that there is practically but three moving parts in the device. A stud H is riveted to the top of the casing and carries the pinion F and hand G in freely movable relation thereto. A rack E' is formed on the arc-shaped end of the frame E, and engages the pinion F. A stud I is secured to the lower flange B³ of the casing and supports the rack-frame E in freely movable relation thereto. A slot J is formed in the top of the casing to expose the free end of the hand G which moves from one side of the casing to the other side to indicate the changing temperature of the sad-iron, as will be readily understood.

The rack-frame E is provided with two depending pins K—K respectively, spaced from each other to provide a slot having curved surfaces against which the free end of the thermostat C presses as it changes its form, due to changes in temperature, and moves the rack-frame to operate the hand of the indicator. By arranging the rack-frame, pinion and hand as illustrated, a very small movement of the free end of the thermostat serves to move the free end of the hand G a considerable distance, thereby giving a large range between the "Low" point and the "Danger" point markings on the dial L of the device.

The base-plate B is provided with two vertical slots M—M respectively, into which downwardly-extending edge portions N—N respectively fit in sliding relation thereto and are held therein by friction, which serves to hold the casing to the base-plate.

The base-plate B is provided with an extension which extends beyond the casing and is bifurcated at B⁵. A screw P, extends into the metal body of the sad-iron and holds the base-plate firmly thereto in removable relation therewith and also serves to conduct the heat from the base of the iron to the base-plate and thermostat.

It will also be observed that the casing can be instantly removed from the base-plate for inspection or cleaning, without removing the base-plate from the iron.

When the iron is cold, the indicator is set with the hand pointing to "Low" on the dial, and as the iron is gradually heated, the thermostat gradually assumes a curved form and moves the mechanism so that the pointer gradually moves toward the "Danger" point, and thus the relative temperature is indicated by the position of the hand, as will readily be understood.

Having thus described my invention, I claim as new:

1. An indicator comprising a base-plate having one end bifurcated, means extending through said bifurcated portion for holding said base-plate to a heating device in heat conducting relation thereto, a thermostat connected to said base-plate at one end in heat conducting relation therewith, a casing supported by the base-plate having a slot therein, an indicator hand, one end of which is visable through said slot, and gearing carried by the casing and connecting said hand and thermostat in operative relation.

2. An indicator comprising a base-plate having one end bifurcated, means extending through said bifurcated portion for holding said base-plate to a heating device in heat conducting relation thereto, a thermostat connected to said base-plate at one end in heat conducting relation therewith, a casing supported by the base-plate in freely removable relation thereto, having a slot therein, an indicator hand, one end of which is visible through said slot, and gearing carried by the casing and connecting said hand and thermostat in operative relation.

3. An indicator comprising a base-plate having slots therein for supporting a casing and having one end bifurcated, means extending through said bifurcated portion for holding said base-plate to a heating device in heat conducting relation thereto, a thermostat connected to said base-plate at one end in heat conducting relation therewith, a casing supported on the base-plate having a slot therein, and having edge portions which fit in said slots formed in the base-plate, and gearing to actuate the hand carried by the casing and connecting the free end of said thermostat with said hand, all of the moving parts being carried by the casing and removable therewith from the base-plate.

Signed at New York city, in the county of New York and State of New York this 17th day of September, A. D. 1925.

HERBERT E. RIDER.